US006022504A

United States Patent [19]

Boaz et al.

[11] Patent Number: 6,022,504

[45] Date of Patent: Feb. 8, 2000

[54] METHOD OF MANUFACTURING A CAULKING NOZZLE

[76] Inventors: William Jesse Boaz, 1190 7th Ave., #82, Santa Cruz, Calif. 95062; Daniel Harvey Linn, 1693 Toni Ct., Minden, Nev. 89423

[21] Appl. No.: 09/047,886

[22] Filed: Mar. 25, 1998

Related U.S. Application Data

[62] Division of application No. 08/697,635, Aug. 28, 1996, Pat. No. 5,833,099.

[51] Int. Cl.[7] .......................... B29C 45/14; B29C 70/70

[52] U.S. Cl. .......................................... 264/250; 264/274

[58] Field of Search .................................. 222/568, 570, 222/325, 326, 327; 264/250, 255, 268, 271.1, 274, 275, 279.1

[56] References Cited

U.S. PATENT DOCUMENTS

| | | | |
|---|---|---|---|
| D. 277,827 | 3/1985 | Olsson . | |
| D. 289,881 | 5/1987 | Krumm . | |
| D. 333,955 | 3/1993 | Hatgas et al. . | |
| D. 352,003 | 11/1994 | Groene et al. . | |
| D. 355,576 | 2/1995 | Groene et al. . | |
| 3,125,801 | 3/1964 | Fields . | |
| 3,445,559 | 5/1969 | Siteman . | |
| 3,570,726 | 3/1971 | Pomodoro | 222/568 |
| 4,101,077 | 7/1978 | Gibson . | |
| 4,310,366 | 1/1982 | Van Manen | 156/69 |
| 4,380,425 | 4/1983 | Edelman . | |
| 4,726,925 | 2/1988 | Binder | 264/328.12 |
| 4,878,599 | 11/1989 | Greenway . | |
| 4,946,081 | 8/1990 | Jacobson . | |
| 4,957,225 | 9/1990 | Childers . | |
| 4,988,472 | 1/1991 | Orimoto et al. | 264/273 |
| 5,002,623 | 3/1991 | Steer et al. | 156/221 |
| 5,104,013 | 4/1992 | Hawley . | |
| 5,248,071 | 9/1993 | Ray . | |
| 5,249,716 | 10/1993 | O'Sullivan . | |
| 5,249,876 | 10/1993 | Hattman et al. . | |
| 5,301,835 | 4/1994 | Fulks et al. . | |
| 5,346,380 | 9/1994 | Ables . | |

*Primary Examiner*—Angela Ortiz
*Attorney, Agent, or Firm*—Coudert Brothers

[57] ABSTRACT

An improved caulking nozzle removably attachable to a caulking tube front cover threaded male adapter positioned on a caulking tube front cover of a caulking tube is insertable in a caulking gun. The improved caulking nozzle includes a female insert which comprises a plurality of female insert threads disposed circumferentially therein. The female insert further includes a female insert opening therethrough. The female insert is constructed from a hard material. A caulking nozzle is integrally connected to the female insert. The caulking nozzle includes a caulking nozzle opening therethrough. The caulking nozzle is constructed from a soft material. A method of manufacturing an improved caulking nozzle has the following steps: A) making a female insert from a hard material; B) placing the female insert into a caulking nozzle cavity mold within an injection molder; C) injecting a soft material into the caulking nozzle cavity mold until the soft material encompasses the female insert; D) allowing the soft material to harden; and E) removing the improved caulking nozzle from the caulking nozzle cavity mold.

11 Claims, 4 Drawing Sheets

METHOD OF MANUFACTURING A CAULKING NOZZLE

This application is a divisional of Ser. No. 08/697,635, filed on Aug. 28, 1996, which is now U.S. Pat. No. 5,833, 099.

BACKGROUND OF THE INVENTION

1. Field of the Invention

The present invention relates to improvements of the application of sealers. More particularly, the present invention relates to an improved caulking nozzle having a caulking tip insert constructed from a hard material. The caulking tip insert is placed into the nozzle of an injection molder and a thermoplastic is molded around the caulking tip insert. The caulking nozzle is constructed from a softer flexible material which functions to allow directionally dispensing caulking compound. The present invention is easily adapted to caulking tubes with either a threaded or tapered adapter for the nozzle, and one-piece tubes having a self contained nozzle.

2. Description of the Prior Art

The prior art teaches a number of methods of discharging caulking material through adapters fitted to one distal end of a tube of caulking compound or adhesive materials. Typically the prior art nozzles are constructed with certain common configurations. A tube containing caulking material, has on one end securely attached, a nozzle which typically is ridged. In one embodiment the nozzle is securely and permanently attached. The nozzle in an alternative embodiment is removably attached to a central mating thread adapter. Most variants of the prior art are found in the market place, however, none are unique in providing a flexible nozzle that attaches to caulking tubes having a permanent nozzle attached. The present invention uniqueness stems from the use of a threaded insert in the nozzle. The threaded insert is manufactured from a hard material and placed in the nozzle during the injection molding process. The threads function to grip the nozzle on caulking tubes to securely attach the present invention.

Numerous innovations for improved caulking nozzles have been provided in the prior art that are described as follows. Even though these innovations may be suitable for the specific individual purposes to which they address, they differ from the present invention as hereinafter contrasted.

In U.S. Pat. No. 5,346,380, titled “Caulking Tube Extension Nozzle,” invented by James T. Ables, a caulking tube extension nozzle engagable to a caulking tube for facilitating a distribution of caulk onto hard-to-reach or awkwardly positioned areas. The extension nozzle includes a nozzle coupling assembly engagable to both soft plastic caulking nozzles and threaded nozzle receivers provided on caulking tubes having detachable nozzles. The coupling assembly tapers into an elongated extension tube having a flexible section which allows the extension tube to be bent while still permitting fluid communication therethrough. Alternate embodiments of the present invention include a bead forming assembly for shaping a bead of caulk dispensed from the extension nozzle and an adjustment mechanism for positioning the bead forming assembly relative to the dispensed caulk.

The patented invention differs from the present invention because the patented invention has accordion pleats which keep the flexible tube from collapsing. The patented invention further has an adjustable device for forming the caulking bead. One distal end is adapted to attach to the threaded end of a caulking tube. The present invention is adapted to cooperate with both threaded caulking tubes and tubes with a nozzle attached.

In U.S. Pat. No. 5,301,835, titled “Adapter For Dispensing Material From a Sausage Type Package,” invented by Henry J. Fulks, Ronald R. Kubisk, Timothy W. Mitin, and Ronald W. Wieck, an adapter for use in an extrusion device can use sausage skin packaged sealant-type extrudable materials. A sausage skin package is inserted into the adapter which is, in turn, inserted into an extrusion device, such as a caulking gun. The adapter has four pieces, a cylindrical tube, a plunger, a removable nozzle base, and a removable nozzle tip. The adapter can be designed to be reversible where a sausage is inserted between the plunger and the nozzle base, force is applied to the plunger by the extrusion device forcing the sealant-type material from the sausage package and after the material is expelled, a wad of package skin is removed, a new sausage package is inserted into the open end of the tube and the removable nozzle base is attached to the tube and the dispensing operation can be continued.

The patented invention differs from the present invention because the patented invention is a device for use with caulking compounds dispensed in bags which are inserted into a tube having a nozzle attached. The present invention is a nozzle adaptable to a variety of caulking tubes.

In U.S. Pat. No. 5,249,876, titled “Caulking Nozzle,” invented by Harold M. Hattman, a nozzle for applying filler material to a corner surface is provided having a generally cylindrical barrel. One end of the barrel has three beveled surfaces which taper to form a triangular spear shape. A central bore extends longitudinally throughout the extent of the barrel and forms a tip opening at the tapered end and a supply opening at the opposite end. Filler material proceeds through the central bore and out the tip opening onto the surface to which it is applied.

The patented invention differs from the present invention because the patented invention is a tip functioning to apply caulking material into corners. It has a somewhat triangular shape adapted to form a bead in a comer. The present invention nozzle is round in cross section and has a flexible portion to facilitate application of caulking into comers. The flexible section is smooth and does not have accordion pleats. The flexible section is stiff enough to support itself.

In U.S. Pat. No. 5,249,716, titled “Caulking Nozzle Assembly,” invented by Paul O’Sullivan, the caulking nozzle assembly is a flexible caulk-dispensing tube which is readily attached and removed from a caulk canister’s spout dispenser by use of an attaching nut which is fitted over one end of the caulk-dispensing tube. The caulking nozzle assembly further includes a curved angle guide tube that fits over the caulk-dispensing tube. As the angle guide tube is stiffer than the caulk-dispensing tube fitted therein, proper placement of the angle guide tube over the caulk-dispensing tube provides a caulking nozzle assembly which acts as an extension of the spout dispenser and which directionally dispenses the caulking material to surfaces difficult to reach in accordance with the shape of the angle guide tube.

The patented invention differs from the present invention because the patented invention is a flexible attachment which attaches over a caulking tube nozzle. The patented invention further includes a second hollow assembly which bends the nozzle into a ridged curve. The present invention does not have a second curved device to bend the flexible nozzle into a curve.

In U.S. Pat. No. 5,248,071, titled “Re-sealable Nozzle and Cap Assembly,” invented by Cecil D. Ray, the invention is a re-sealable nozzle and cap assembly for dispensing caulking material, sealant, adhesive or the like comprising a hollow nozzle having a generally conical shape. The nozzle includes means at its wider end for connecting the nozzle to a tube. External threaded sections of varying diameter are located along the length of the nozzle. The size of the aperture for dispensing the caulking material or the like can be selected by the user by cutting the nozzle across its conical axis at a point which results in the proper aperture diameter. The assembly also includes a hollow, cylindrical cap sealed at one end and having internal threaded sections of varying diameter along the length of said cap for engaging the exterior threads on the nozzle and thus forming an air-tight seal when the cap is screwed on said nozzle.

The patented invention differs from the present invention because the patented invention is a nozzle with a removable cap for sealing after the nozzle is opened. The present invention is a nozzle and does not include a cap In U.S. Pat. No. 5,104,013, titled "Caulking Tube Nozzle Adaptor Adjustable for Different Caulk Bead Sizes," invented by Donald R. Hawley, an adaptor for a caulking tube nozzle, the adaptor including a reducing coupling having a large end secured to the caulking tube nozzle and a small end which is threaded, and a cap having threads for engagement with the threads of the small end of the coupling to thereby cap and seal caulking material within the coupling when the caulking tube is not in use. In one form the large end of the reducing coupling is internally threaded for self-tapping engagement with the caulking tube nozzle, and the small end is externally threaded for engagement with internal threads in the cap. In another form, the large end of the coupling is formed integrally with the end of the caulking tube.

The patented invention differs from the present invention because the patented invention is a series of removable nozzles that adapt the opening to a user's requirements. The present invention is a single nozzle which is flexible.

In U.S. Pat. No. 4,957,225, titled "Replaceable Caulking Tip For Use On Caulking Cartridges and Method of Manufacture," invented by Steven M. Childers, a replaceable caulking tip is disclosed for use on the tubular nozzle of a caulking cartridge or the like. The tip includes a tubular body which is internally threaded for replaceable engagement on the nozzle. An outlet orifice is formed at the other end of the body with substantial body material surrounding the orifice to permit shaping of the tip, and reshaping if necessary. The orifice is inclined about 12 to 20 degrees, preferably about 15 to 17 degrees, from a plane perpendicular to a longitudinal axis of the tip and is an elongated configuration. The body of the tip is preferably formed from a hard material permitting shaping of the body yet facilitating repeated use of the tip, the body material being rounded or flared about the orifice. An indexing notch is formed on the body to assure proper angular alignment of the tubular body during steps of inclining and elongating the orifice in a method of manufacture.

The patented invention differs from the present invention because the patented invention is a short rigid nozzle adapted to threaded caulking tubes. It cannot adapt to caulking tubes with integral nozzles.

In U.S. Pat. No. 4,946,081, titled "Applicator Nozzle for Sealant Cartridges and The Like," invented by Lawrence R. Jacobson, the invention relates to a discharge nozzle for a tube of sealant materials which is provided with an aperture or slot that allows the user to monitor the rate of flow of sealant from the tube to assist in the formation of a smooth bead or fillet of sealant material when it is applied through the nozzle to a substrate.

The patented invention differs from the present invention because the patented invention is a nozzle adapted for use with a threaded caulking tube. It cannot adapt to caulking tubes with integral nozzles.

In U.S. Pat. No. 4,878,599, titled "Caulking Nozzle," invented by John M. Greenway, a nozzle for a tube comprising material to be expelled through the nozzle in a direction from the tube to an outlet at the end of the nozzle opposite the tube, the material being hardenable upon exposure to air and residual material at the tip of the nozzle forming a hardened plug. The nozzle comprises a series of hollow members, the members having a first and second end wherein the first end has a first inner cross-sectional dimension and the second end has a second inner cross-sectional dimension, wherein the second dimension is at least as great as the first dimension, the first dimension being different for each member, wherein the member having the largest first dimension is at one end of the nozzle and the member having the smallest dimension is at the other end of the nozzle, the members being positioned between the largest and the smallest dimensioned members in order of decreasing dimensions in the direction of the material is to be expelled and, whereby the series forms a hollow vessel having a stepwise decreasing inner cross-sectional first dimension, wherein the largest dimensioned member comprises an opening at one end suitable for connection to the tube, and wherein the members are of a length greater than the length of the plug.

The patented invention differs from the present invention because the patented invention is a caulking tube with a nozzle having a series of removable sections functioning to adapt the opening to a users' requirements. The patented invention is not flexible and has no provisions for attachment to a threaded tube.

In U.S. Pat. No. 4,380,425, titled "Caulking Spout," invented by David J. Edelman, an applicator for applying sealing compounds such as caulking is provided having a tubular spout, an inlet opening which communicates with the sealing compound and an outlet orifice. A finger-shaped applicator tip extends longitudinally outward while angled inwardly of the spout and has an oval cross-section in the vicinity of the outlet which makes the outlet orifice crescent-shaped.

The patented invention differs from the present invention because the patented invention is a caulking tube having a unique nozzle shaped like a finger. The patented invention is not flexible and has no provisions for attachment to a threaded tube.

In U.S. Pat. No. 4,101,077, titled "Caulking Spout," invented by Robert R. Gibson, a caulking spout through which caulk may be dispensed from a dispenser into a corner joint at various angles of attack without an accompanying substantial change in the shape of the bead of caulk being dispensed. The spout comprises a body having a neck elongated along a body axis merging with a rounded tip traversing the axis and an outlet orifice formed in the rounded tip to one side of and off the body axis. An inlet orifice is formed in the end of the elongated neck distal the rounded tip. A channel communicates between the inlet and outlet orifices with a first channel portion extending from the inlet orifice along the body axis and merging with a second channel portion which diverges from the body axis and terminates at the outlet orifice.

The patented invention differs from the present invention because the patented invention is a nozzle adapted to be installed on a caulking tube having integral nozzle. It is not adaptable to a threaded tube and it does not have a flexible section.

In U.S. Pat. No. D355,576, titled "Combination Caulking Tube Cap and Applicator," invented by David E. Groene, the combination caulking tube cap and applicator, is as shown and described.

In U.S. Pat. No. D352,003, titled "Combination Caulking Tube Cap and Applicator," invented by David E. Groene and Earl E. Hoyt, the combination caulking tube cap and applicator, is as shown and described.

In U.S. Pat. No. D333,955, titled "Tip for a Dispenser of Caulking, Adhesive or Sealant," invented by David J. Hatgas, David N. Peresie, Thomas P. Semans, and Roger L. Streets, the ornamental design for the tip for a dispenser of caulking, adhesive or sealant, is as shown.

In U.S. Pat. No. D289,881, titled "Extrusion Head for Caulking Gun," invented by James L. Knirum, the ornamental design for an extrusion head for a caulking gun, is as shown and described.

In U.S. Pat. No. D277,827, titled "Caulking Spout," invented by Sven O. Olsson, the ornamental design for a caulking spout, is as shown and described.

Each of the foregoing five patented inventions is an ornamental design having no features similar to the present invention.

Numerous innovations for improved caulking nozzles have been provided in the prior art that are adapted to be used. Even though these innovations may be suitable for the specific individual purposes which they address, they would not be suitable for the purposes of the present invention as heretofore described.

SUMMARY OF THE INVENTION

The present invention provides an improved caulking nozzle and a method of manufacturing the nozzle for applying caulking compounds into hard to reach areas, where a standard tip is too large or the rigidity of the tip of the caulking device interferes with the application. The present invention comprises an improved caulking nozzle having a caulking tip insert constructed from a hard material. The caulking tip insert, referred to herein as a female insert, is placed into the nozzle of an injection molder and a thermoplastic is molded around the caulking tip insert. The caulking nozzle is constructed from a softer flexible material which functions to allow directionally dispensing caulking compound. The present invention is adapted to caulking tubes with a threaded or tapered adapter for the nozzle, and one-piece tubes having a self contained nozzle.

The improved method of manufacture results in a nozzle that can be easily adapted to caulking tubes which have existing nozzles attached. The method of manufacturing an improved caulking nozzle comprises: (a) making a female insert from a hard material; (b) placing the female insert into a caulking nozzle cavity mold within an injection molder; (c) injecting a soft material into the caulking nozzle cavity mold until the soft material encompasses the female insert; (d) allowing the soft material to harden; and (e) removing the improved caulking nozzle from the caulking nozzle cavity mold.

The types of problems encountered in the prior art are that the nozzles are either permanently attached to the caulking tubes or a nozzle must be threaded on to an adapter portion of the face of a caulking tube. Typically the nozzles of the prior art are rigid and cannot be positioned to apply caulking compound into difficult to reach areas. The threaded type of nozzle is expensive to manufacture and can only be used with special caulking tubes manufactured for this purpose. Further the technique of applying a smooth bead requires that the tip be oriented in a particular fashion, often this requires the user to position himself or herself and the caulking tool in an awkward or impossible position.

Another problem encountered in the prior art is the application end diameter of the tip is large enough to prevent reaching critical areas that must applied with the caulking compound.

In the prior art, unsuccessful attempts to solve this problem were attempted with either flexible tips or interchangeable tips, but not both, resulting in changing tips to adapt to the conditions. Changing tips causes the bead to be disrupted leaving a mark showing where the tip was stopped and started. This cosmetically undesirable discontinuity is avoided in the present invention because the tip is flexible and rigid enough to be self-supporting.

Innovations within the prior art are rapidly being exploited by the various tips encountered in the market place for both threaded containers and premolded containers.

The present invention went contrary to the teaching of the art by providing an improved nozzle easily adapted to both threaded and molded containers of caulking compound.

The present invention solved a long felt need for a caulking tip that is flexible so the user may bend the tip portion to apply caulking compounds to otherwise unreachable areas and can be attached, by threading on to caulking tubes having self contained nozzles.

Accordingly, it is an object of the present invention to provide an adapter for an applicator having a flexible tip for reaching difficult areas and a rigid tip for free hand application.

More particularly, it is an object of the present invention to provide a method of applying a tip to existing compound containers having a tapered tip and threaded containers without a tip.

In keeping with these objects, and with others which will become apparent hereinafter, one feature of the present invention resides, briefly stated, in a longer tip capable of reaching deeper into cracks and comers.

Another feature of the present invention is the rigidity of the tip, which allows an operator to use the tip without holding the end.

When the flexible tip is designed in accordance with the present invention, a smooth continuous bead may be applied with no cosmetically discernable discontinuities.

In accordance with another feature of the present invention, the tip is of a smaller diameter to reach deeper into cracks or comers.

Another feature of the present invention is that taper and wall construction prevents the tip from kinking or crimping when it is bent.

Yet another feature of the present invention is that an internally threaded portion is constructed from a hard plastic material which permits threading the present invention onto a tube of compound having tips as a part of the initial construction and those prethreaded.

The novel features which are considered characteristic for the invention are set forth in the appended claims. The invention itself, however, both as to its construction and its method of operation, together with additional objects and advantages thereof, will be best understood from the following description of the specific embodiments when read and understood in connection with the accompanying drawings.

BRIEF LIST OF REFERENCE NUMERALS UTILIZED IN THE DRAWINGS

Embodiment

Figure 1:
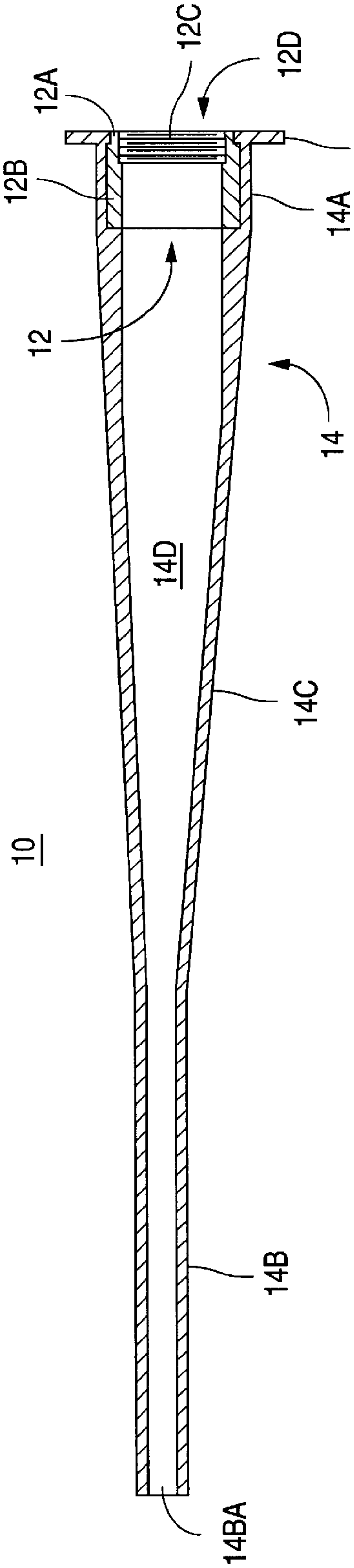
FIG. 1 is a cross sectional view of an improved caulking nozzle.

10—an improved caulking nozzle (10)
12—female insert (12)
12A—female insert inner member (12A)
12B—female insert outer member (12B)
12C—female insert threads (12C)
12D—female insert opening (12D)
12E—female insert projection (12E)
14—caulking nozzle (14)
14A—caulking nozzle inner member (14A)
14AA—caulking nozzle outer member lip (14AA)
14B—caulking nozzle outer member (14B)
14BA—caulking nozzle outer member opening (14BA)
14C—caulking nozzle middle member (14C)
14D—caulking nozzle opening (14D)
16—caulking gun (16)
16A—caulking gun front member (16A)
16AA—caulking gun front member slot (16AA)
18—caulking tube (18)
18A—caulking tube front cover (18A)
18AA—caulking tube front cover threaded male adapter (18AA)

DESCRIPTION OF THE PREFERRED EMBODIMENT

Nozzles are either permanently attached to the caulking tubes or a nozzle must be threaded on to an adapter portion of the face of a caulking tube. Typically the nozzles are rigid, short and relatively large in diameter which precludes positioning the nozzle to apply caulking compound into difficult to reach areas. The threaded type of nozzle is expensive to manufacture and can only be used with a special caulking tube manufactured for this purpose. The permanently attached nozzles heretofore could not be modified by adding an adapter. What is desired is a nozzle that is flexible enough to bend into difficult areas yet is rigid enough to function without bending on open areas. Further the nozzle should attach to existing caulking tube forms.

Firstly referring to FIG. 1 which is a cross sectional view of an improved caulking nozzle 10 having the following features: improved caulking nozzle 10, female insert 12, female insert inner member 12A, female insert outer member 12B, female insert threads 12C, female insert opening 12D, caulking nozzle 14, caulking nozzle inner member 14A, caulking nozzle outer member lip 14AA, caulking nozzle outer member 14B, caulking nozzle outer member opening 14BA, caulking nozzle middle member 14C, and caulking nozzle opening 14D.

An improved caulking nozzle 10 comprises a caulking nozzle 14 having a female insert 12 securely attached at one distal end. The female insert 12 comprises a female insert inner member 12A functioning to provide a shoulder in cooperation with a female insert outer member 12B that retains the female insert 12 within the caulking nozzle 14. The female insert 12 comprises a female insert threads 12C circumferentially attached at an inner diameter of a female insert opening 12D. The female insert threads 12C fiction to securely fasten the caulking nozzle 14 to a caulking tube front cover threaded male adapter 18AA.

The caulking nozzle 14 comprises a caulking nozzle inner member 14A at one distal end, which cooperates with the female insert outer member 12B to securely fasten the female insert 12. The caulking nozzle inner member 14A is securely attached to a caulking nozzle outer member lip 14AA which functions as a stop and strengthening member when the caulking nozzle 14 is screwed onto a caulking tube 18. During the manufacturing process the caulking nozzle inner member 14A shrinks around the female insert inner member 12A securely fastening the female insert inner member 12A to the caulking nozzle inner member 14A. This prevents the female insert 12 from spinning or other movement as the nozzle is installed. FIGS. 2C and 2D show projections 12E around the circumference of female insert outer member 12B. Projection 12E is used in the preferred embodiment of the present invention to provide female insert 12 with a mechanical attachment to nozzle 14 and to further prevent female insert 12 from spinning or other movement when nozzle 14 is attached to a tube of compound.

The caulking nozzle inner member 14A on an opposite distal end is securely attached to a proximal end of a caulking nozzle middle member 14C. The caulking nozzle middle member 14C is constructed of materials that permit bending without constricting a caulking nozzle opening 14D. The opposite distal end of the caulking nozzle middle member 14C is securely attached to a proximal end of a caulking nozzle outer member 14B having a caulking nozzle outer member opening 14BA functioning to direct the caulking compound. The caulking nozzle outer member opening 14BA may be cut and shaped by a user to apply caulking material in a desired fashion.

The caulking nozzle 14 is constructed from a soft material selected from a group consisting of plastic, plastic composite, metal, metal alloy, rubber, rubber composite, carbon-graphite, and wood composite.

The female insert 12 is manufactured from relatively rigid materials selected from the group consisting of plastic, plastic composite, metal, metal alloy, rubber, rubber composite, fiberglass, epoxy, carbon-graphite, and wood.

Figure 3:
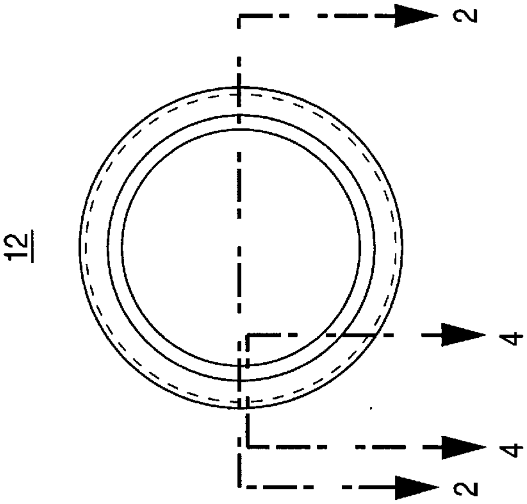
FIG. 3 is a top view of a female insert.
Figure 2:
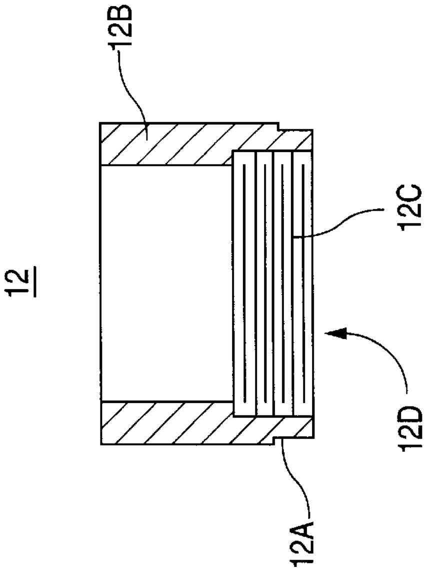
FIG. 2 is a cross sectional view of a female insert.

Secondly, referring to FIG. 2 which is a cross sectional view of a female insert 12 along line 2—2 in FIG. 3 having the following features: improved caulking nozzle 10, female insert 12, female insert inner member 12A, female insert outer member 12B, female insert threads 12C, and female insert opening 12D.

The female insert 12 comprises the female insert inner member 12A functioning to provide a shoulder in cooperation with the female insert outer member 12B that retains the female insert 12 within the caulking nozzle 14. The female insert 12 comprises the female insert threads 12C circumferentially attached at an inner diameter of the female insert opening 12D. The female insert threads 12C may be buttress-style which function to cut into and thread onto an existing tip. Threads 12C may also be standard 60° threads which can easily be threaded onto a metal threaded tube of compound.

Thirdly, referring to FIG. 3 which is a top view of a female insert 12.

Figure 4:
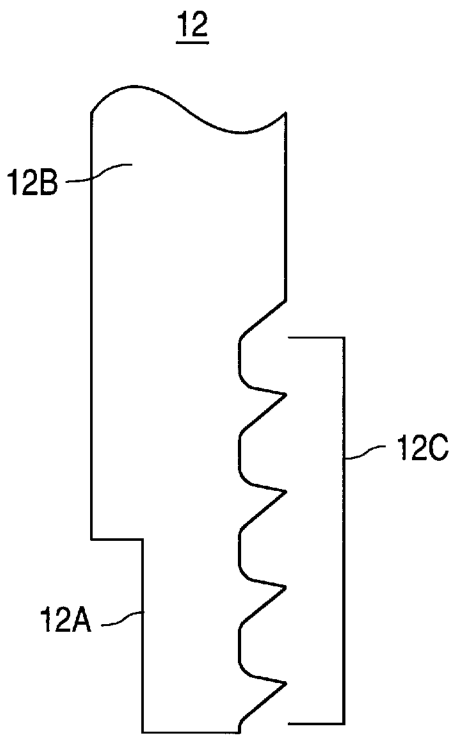
FIG. 4 is an enlarged cross sectional view of a female insert exhibiting female insert threads known as buttress threads.
Figure 5:
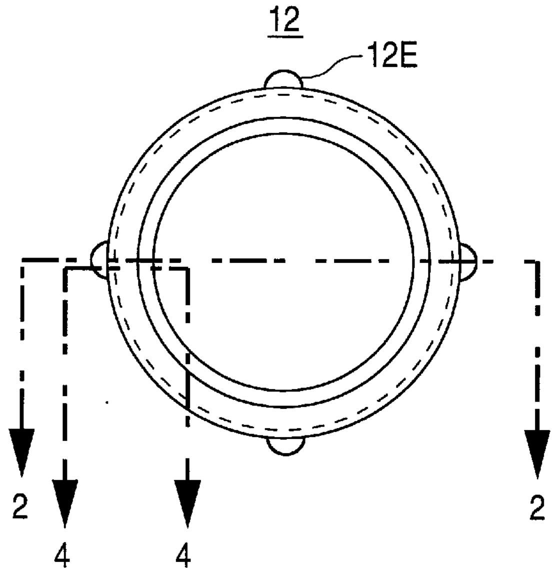
FIG. 5 is a top view of a preferred embodiment of the female insert showing projections.
Figure 6:
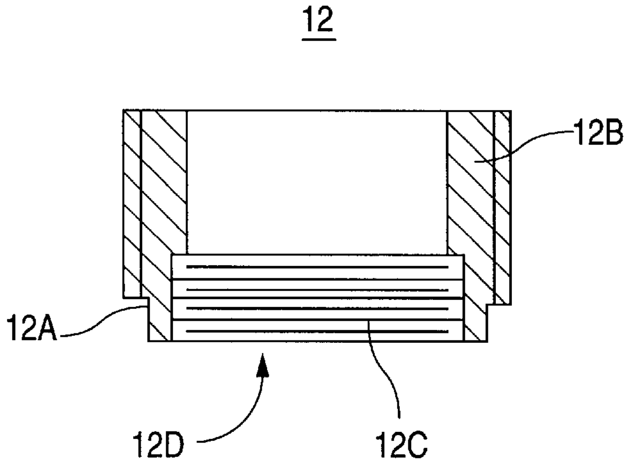
FIG. 6 is an enlarged cross sectional view of the female insert shown in FIG. 5.

Referring to FIG. 4 which is an enlarged cross sectional view of a female insert 12 along line 2B—2B of FIG. 3 exhibiting female insert threads 12C having the following features: female insert 12, female insert inner member 12A, female insert outer member 12B, and female insert threads 12C. The female insert threads 12C shown in FIG. 4 are known as buttress threads.

The female insert inner member 12A is securely attached to a proximal end of the female insert outer member 12B forming a shoulder. The inner diameter of the female insert outer member 12B comprises the female insert threads 12C. The female insert threads 12C are made from a hard plastic material which functions to thread onto mating threads on threaded caulking tubes or onto a tapered outer wall of a non-threaded caulking tube of compound.

Figure 7:
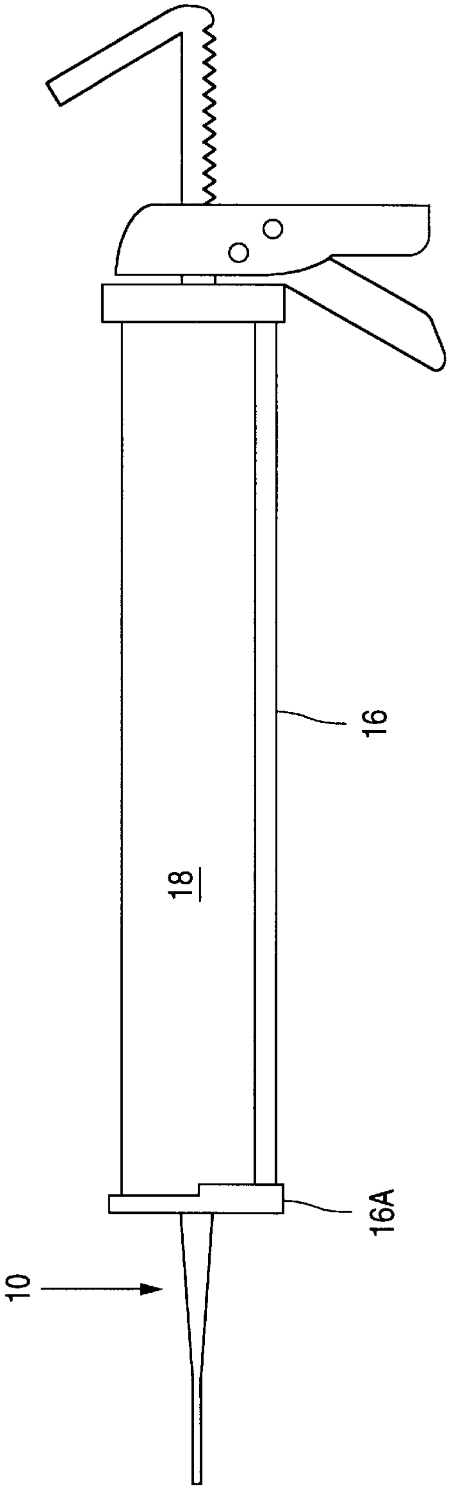
FIG. 7 is a side view of a caulking gun containing a caulking tube attached to an improved caulking nozzle.

Now, referring to FIG. 7 which is a side view of a caulking gun 16 containing a caulking tube 18 attached to an improved caulking nozzle 10, the caulking gun 16 has the following features: caulking gun 16, caulking gun front member 16A, and caulking tube 18.

A caulking gun 16 comprises a caulking gun front member 16A functioning to removably retain a caulking tube 18 having a improved caulking nozzle 10 attached at an outer distal end.

Figure 8:
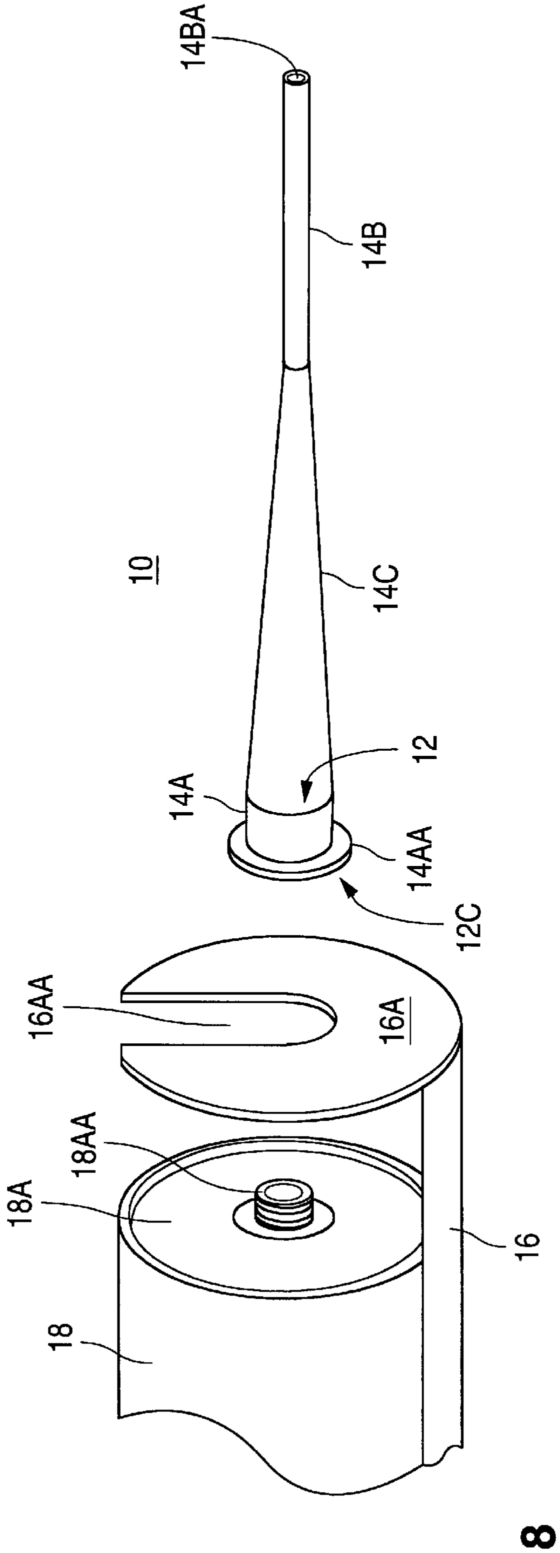
FIG. 8 is an exploded perspective view of a caulking gun containing a caulking tube being attached to an improved caulking nozzle which is inserted within a caulking gun front member slot of a caulking gun front member.

Now, referring to FIG. 8 which is an exploded perspective view of a caulking gun 16 having the following features: improved caulking nozzle 10, female insert 12, female insert inner member 12A, female insert outer member 12B, female insert threads 12C, female insert opening 12D, caulking nozzle 14, caulking nozzle inner member 14A, caulking nozzle outer member lip 14AA, caulking nozzle outer member 14B, caulking nozzle outer member opening 14BA, caulking nozzle middle member 14C, caulking gun 16, caulking gun front member 16A, caulking gun front member slot 16AA, caulking tube 18, caulking tube front cover 18A, and caulking tube front cover threaded male adapter 18AA.

The improved caulking nozzle 10 comprises the caulking nozzle 14 having the female insert 12 securely attached at one distal end. The female insert 12 comprises the female insert inner member 12A functioning to provide a shoulder in cooperation with the female insert outer member 12B that retains the female insert 12 within the caulking nozzle 14. The female insert 12 comprises the female insert threads 12C circumferentially attached at the inner diameter of the female insert opening 12D. The female insert threads 12C function to securely fasten the caulking nozzle 14 to the caulking tube front cover threaded male adapter 18AA.

The caulking nozzle 14 comprises the caulking nozzle inner member 14A at one distal end, which cooperates with the female insert outer member 12B to securely fasten the female insert 12. The caulking nozzle inner member 14A is securely attached to the caulking nozzle outer member lip 14AA which functions as a stop when the caulking nozzle 14 is screwed to the caulking tube 18.

The caulking nozzle inner member 14A on the opposite distal end is securely attached to the proximal end of the caulking nozzle middle member 14C. The caulking nozzle middle member 14C is constructed of materials that permit bending. The opposite distal end of the caulking nozzle middle member 14C is securely attached to the proximal end of the caulking nozzle outer member 14B having the caulking nozzle outer member opening 14BA functioning to direct caulking compound. The caulking nozzle outer member opening 14BA may be cut and shaped by a user to apply caulking material in a desired fashion.

The caulking gun 16 comprises a caulking gun front member 16A securely attached at an outer distal end having a caulking gun front member slot 16AA therein. The caulking gun front member slot 16AA functions to removably attach the caulking tube 18. The caulking tube 18 is securely attached to a caulking tube front cover 18A at an outer circumference. The caulking tube front cover 18A is centrally securely attached to a caulking tube front cover threaded male adapter 18AA. The caulking tube front cover threaded male adapter 18AA is threaded in a complementary fashion to accept the female insert threads 12C.

It will be understood that each of the elements described above, or two or more together, may also find a useful application in other types of constructions differing from the type described above.

FIG. 9—METHOD (110) OF MANUFACTURING AN IMPROVED CAULKING NOZZLE

Figure 9:
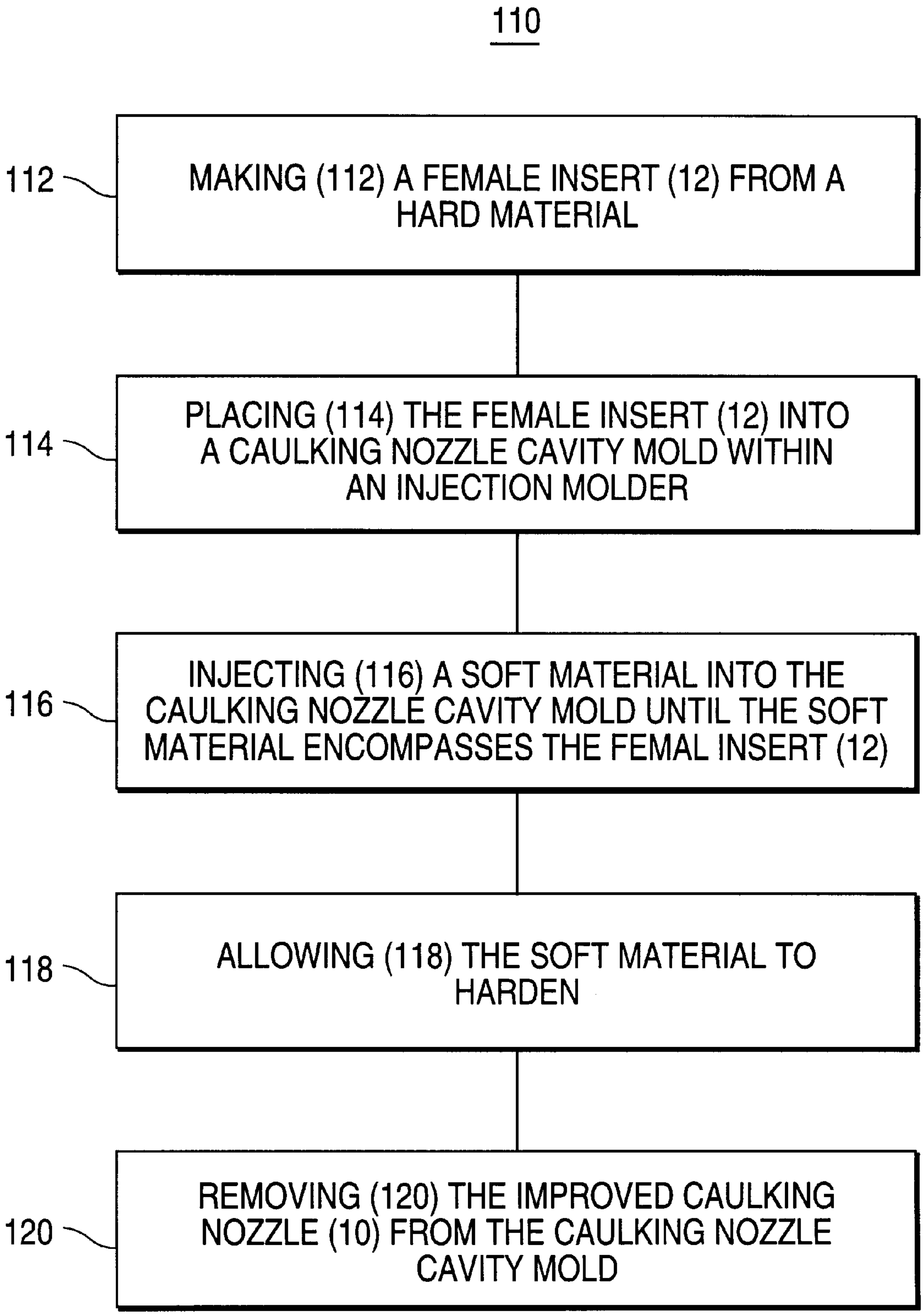
FIG. 9 is a method of manufacturing an improved caulking nozzle.

- 110—method of manufacturing an improved caulking nozzle (10)
- 112—making (112) a female insert (12) from a hard material
- 114—placing (114) the female insert (12) into a caulking nozzle cavity mold within an injection molder
- 116—injecting (116) a soft material into the caulking nozzle cavity mold until the soft material encompasses the female insert (12)
- 118—allowing (118) the soft material to harden
- 120—removing (120) the improved caulking nozzle (10) from the caulking nozzle cavity mold Now, referring to FIG. 9 which is a method of manufacturing an improved caulking nozzle having the following features: method of manufacturing an improved caulking nozzle, making 112 a female insert from a hard material, placing 114 the female insert into a caulking nozzle cavity mold within an injection molder, injecting 116 a soft material into the caulking nozzle cavity mold until the soft material encompasses the female insert, allowing 118 the soft material to harden, and removing 120 the improved caulking nozzle from the caulking nozzle cavity mold.

The preferred method of manufacturing the improved caulking nozzle comprises making 112 a female insert from a hard material such as glass-filled nylon or glass-filled polypropylene. Still more preferably the glass content was about 30%. The female insert 12 is manufactured from a soft material such as nylon, polypropylene, or high density polyethylene.

EXAMPLES 1–4

In Examples 1 and 2, two types of improved caulking nozzles 10 were manufactured using DuPont's 30% glass-filled nylon for female insert 12. In Example 1, a rigid type of caulking nozzle 10 was manufactured using DuPont's 6/6 nylon for caulking nozzle 14. In Example 2, a flexible type of caulking nozzle 10 was manufactured using Monsanto's Santoprene® D-50 for caulking nozzle 14. In Example 3, rigid nozzle 10 was manufactured using General Polymer's 30% glass-filled polypropylene for female insert 12 and high density polyethylene (HDPE) for caulking nozzle 14. In Example 4, flexible nozzle 10 was manufactured using General Polymer's 30% glass-filled polypropylene for female insert 12 and low density polyethylene (LDPE) for caulking nozzle 14. An injection molding press manufactured by the Van Dom Company and the method described above in reference to FIG. 9 were used in each of the Examples 1, 2, 3 and 4 to manufacture the types of improved caulking nozzle 10 illustrated in FIGS. 1, 2, 4, 5, and 6.

The dimensions for each of the nozzles 10 of Examples 1 through 4 were as follows: The length of improved caulking nozzle 10 was 8 inches. The outer and inner diameters and length of caulking nozzle outer member 14B were 0.236 inch, 0.156 inch and 3 inches, respectively. The diameter and thickness of caulking nozzle outer member lip 14AA were 1.25 inches and 0.05 inch, respectively. The inner diameter of caulking nozzle inner member 14A was 0.55 inch. The outer and inner diameters of female insert outer member 12B were 0.743 and 0.55 inch, respectively. The length of female insert 12 was 0.55 inch. The outer diameter and length of female insert inner member 12A were 0.69 inch and 0.1 inch, respectively. The four projections 12E are equally spaced at the 12, 3, 6 and 9 o'clock positions around the circumference of female insert outer member 12B and have a radius of 0.05 inch. Buttress threads 12C, shown substantially to scale in FIG. 2B, were cut along 0.21 inch of the 0.55 inch length of female insert 12.

While the invention has been illustrated and described as embodied in an improved caulking nozzle, it is not intended to be limited to the details shown, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

What is claimed is:

1. A method of manufacturing an improved caulking nozzle, removably attachable to a caulking tube front cover adapter positioned on a caulking tube front cover of a caulking tube consisting of the following steps:

making a female insert from a hard material, the female insert having a plurality of female insert threads disposed circumferentially therein and a female insert opening therethrough, being attachable to the caulking tube front cover adapter, and having an inner member and an outer member, said inner member having a smaller outer diameter than an outer diameter of said outer member, said inner member and said outer member function in concert with each other to prevent separation of said female insert from said caulking nozzle, said outer member having projections integrally disposed around its circumference to prevent said female insert from movement when said improved caulking nozzle is attached to the caulking tube;

placing the female insert into a caulking nozzle cavity mold within an injection molder;

injecting a soft material into the caulking nozzle cavity mold until the soft material encompasses the female insert;

allowing the soft material to harden; and removing the improved caulking nozzle from the caulking nozzle cavity mold.

2. The method of manufacturing an improved caulking nozzle of claim 1, wherein said female insert is constructed from a hard material selected from a group consisting of plastic, plastic composite, metal, metal alloy, rubber, rubber composite, fiberglass, epoxy, carbon-graphite, and wood.

3. The method of manufacturing an improved caulking nozzle of claim 1, wherein the female insert is constructed from a hard material selected from the group consisting of glass-filled polypropylene and glass-filled nylon.

4. The method of manufacturing an improved caulking nozzle of claim 3, wherein said glass-filled polypropylene or nylon is about 30% glass.

5. The method of manufacturing an improved caulking nozzle of claim 4, wherein the female insert threads are buttress threads.

6. The method of manufacturing an improved caulking nozzle of claim 1, wherein said caulking nozzle is integrally connected to said female insert and said caulking nozzle comprises a caulking nozzle opening therethrough.

7. The method of manufacturing an improved caulking nozzle of claim 6, wherein the caulking nozzle has a caulking nozzle inner member, a caulking nozzle middle member and a caulking nozzle outer member, said caulking nozzle inner member being integrally joined to said caulking nozzle outer member by said caulking nozzle middle member, said caulking nozzle inner member having an outer diameter larger than an outer diameter of said caulking nozzle outer member.

8. The method of manufacturing an improved caulking nozzle of claim 7, wherein said caulking nozzle inner member comprises a caulking nozzle outer member lip securely fastened thereto.

9. The method of manufacturing an improved caulking nozzle of claim 8, wherein said caulking nozzle outer member comprises a caulking nozzle outer member opening having an inner diameter less than an inner diameter of said female insert opening.

10. The method of manufacturing an improved caulking nozzle of claim 9, wherein said caulking nozzle is constructed from a soft material selected from a group consisting of plastic, plastic composite, metal, metal alloy, rubber, rubber composite, carbon-graphite, and wood composite.

11. The method of manufacturing an improved caulking nozzle of claim 10, wherein said plastic is selected from a group consisting of polyethylene, high density polyethylene, low density polyethylene, and nylon.

* * * * *